(12) United States Patent
Kahn et al.

(10) Patent No.: US 7,590,243 B2
(45) Date of Patent: Sep. 15, 2009

(54) DIGITAL MEDIA CONDITIONAL ACCESS SYSTEM FOR HANDLING DIGITAL MEDIA CONTENT

(75) Inventors: Raynold M. Kahn, Los Angeles, CA (US); David D. Ha, San Gabriel, CA (US); Thomas H. James, Pacific Palisades, CA (US); Peter M. Klauss, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 768 days.

(21) Appl. No.: 11/119,712

(22) Filed: May 2, 2005

(65) Prior Publication Data

US 2005/0249350 A1    Nov. 10, 2005

Related U.S. Application Data

(60) Provisional application No. 60/567,910, filed on May 4, 2004.

(51) Int. Cl.
*H04N 7/167* (2006.01)
(52) U.S. Cl. ...................... 380/239; 380/240
(58) Field of Classification Search ............... 380/239, 380/240, 278, 282
See application file for complete search history.

(56) References Cited

U.S. PATENT DOCUMENTS

| | | | |
|---|---|---|---|
| 4,613,901 A | 9/1986 | Gilhousen et al. |
| 4,633,309 A | 12/1986 | Li et al. |
| 4,675,732 A | 6/1987 | Oleson |
| 4,866,769 A | 9/1989 | Karp |
| 4,866,787 A | 9/1989 | Oleson |
| 5,029,207 A | 7/1991 | Gammie |
| 5,033,084 A | 7/1991 | Beecher |
| 5,115,467 A | 5/1992 | Esserman et al. |
| 5,132,992 A | 7/1992 | Yurt et al. |
| 5,168,353 A | 12/1992 | Walker et al. |

(Continued)

FOREIGN PATENT DOCUMENTS

EP    0936812    8/1999

(Continued)

OTHER PUBLICATIONS

"Introduction to Encryption Theory", published by Kyoritsu Shuppan Co., Feb. 25, 1993.

(Continued)

*Primary Examiner*—Gilberto Barron, Jr.
*Assistant Examiner*—Izunna Okeke (57) ABSTRACT

A method, apparatus, and article of manufacture provide the ability to process digital media content. A secret key (Ka) is obtained and encrypted into an authorization key message (AKM) message. One or more entitlement keys (Ke) are then obtained and encrypted using the secret key (Ka) as an encryption key into an entitlement management message (EMM). One or more media content encryption keys (Kc) are obtained and encrypted using one or more of the entitlement keys (Ke) as encryption keys into an entitlement control message (ECM). Digital media data content (Dc) is then obtained and encrypted using the one or more media content encryption keys (Kc). The AKM, EMM, ECM, and encrypted digital media data content are then delivered to a set-top box that is configured to provide digital media services with the content.

36 Claims, 5 Drawing Sheets

U.S. PATENT DOCUMENTS

| | | |
|---|---|---|
| 5,172,413 A | 12/1992 | Bradley et al. |
| 5,199,066 A | 3/1993 | Logan |
| 5,301,352 A | 4/1994 | Nakagawa et al. |
| 5,341,425 A | 8/1994 | Wasilewski |
| 5,357,276 A | 10/1994 | Banker et al. |
| 5,371,551 A | 12/1994 | Logan et al. |
| 5,381,481 A | 1/1995 | Gammie et al. |
| 5,386,587 A | 1/1995 | Yuzawa |
| 5,396,293 A | 3/1995 | Shellard |
| 5,420,866 A | 5/1995 | Wasilewski |
| 5,438,423 A | 8/1995 | Lynch et al. |
| 5,440,336 A | 8/1995 | Buhro et al. |
| 5,473,609 A | 12/1995 | Chaney |
| 5,495,531 A | 2/1996 | Smiedt |
| 5,504,816 A | 4/1996 | Hamilton et al. |
| 5,557,541 A | 9/1996 | Schulhof et al. |
| 5,565,805 A | 10/1996 | Nakagawa et al. |
| 5,583,937 A | 12/1996 | Ullrich et al. |
| 5,586,264 A | 12/1996 | Belknap et al. |
| 5,590,200 A | 12/1996 | Nachman et al. |
| 5,592,551 A | 1/1997 | Lett et al. |
| 5,592,651 A | 1/1997 | Rackman |
| 5,594,491 A | 1/1997 | Hodge et al. |
| 5,619,247 A | 4/1997 | Russo |
| 5,640,453 A | 6/1997 | Schuchman et al. |
| 5,642,418 A | 6/1997 | Farris et al. |
| 5,663,896 A | 9/1997 | Aucsmith |
| 5,675,390 A | 10/1997 | Schindler et al. |
| 5,677,895 A | 10/1997 | Mankovitz |
| 5,699,429 A | 12/1997 | Tamer et al. |
| 5,701,383 A | 12/1997 | Russo et al. |
| 5,710,970 A | 1/1998 | Walters et al. |
| 5,715,315 A | 2/1998 | Handelman |
| 5,715,403 A | 2/1998 | Stefik |
| 5,721,829 A | 2/1998 | Dunn et al. |
| 5,724,646 A | 3/1998 | Ganek et al. |
| 5,729,280 A | 3/1998 | Inoue et al. |
| 5,748,732 A | 5/1998 | Le Berre et al. |
| 5,761,302 A | 6/1998 | Park |
| 5,764,762 A | 6/1998 | Kazmierczak et al. |
| 5,784,095 A | 7/1998 | Robbins et al. |
| 5,787,172 A | 7/1998 | Arnold |
| 5,790,663 A | 8/1998 | Lee et al. |
| 5,793,971 A | 8/1998 | Fujita et al. |
| 5,805,699 A | 9/1998 | Akiyama et al. |
| 5,818,934 A | 10/1998 | Cuccia |
| 5,831,664 A | 11/1998 | Wharton et al. |
| 5,845,240 A | 12/1998 | Fielder |
| 5,850,218 A | 12/1998 | La Joie et al. |
| 5,870,474 A | 2/1999 | Wasilewski et al. |
| 5,899,582 A | 5/1999 | DuLac |
| 5,912,969 A | 6/1999 | Sasamoto et al. |
| 5,914,941 A | 6/1999 | Janky |
| 5,926,205 A | 7/1999 | Krause et al. |
| 5,930,215 A | 7/1999 | Fite et al. |
| 5,933,500 A | 8/1999 | Blatter et al. |
| 5,937,067 A | 8/1999 | Thatcher et al. |
| 5,953,418 A | 9/1999 | Bock et al. |
| 5,966,186 A | 10/1999 | Shigihara et al. |
| 5,973,756 A | 10/1999 | Erlin |
| 5,999,628 A | 12/1999 | Chan |
| 5,999,629 A | 12/1999 | Heer et al. |
| 6,005,937 A | 12/1999 | Lee |
| 6,011,511 A | 1/2000 | Chuong et al. |
| 6,025,868 A | 2/2000 | Russo |
| 6,035,038 A | 3/2000 | Campinos et al. |
| 6,038,319 A | 3/2000 | Chari |
| 6,055,314 A | 4/2000 | Spies et al. |
| 6,055,566 A | 4/2000 | Kikinis |
| 6,061,451 A | 5/2000 | Muratani et al. |
| 6,061,452 A | 5/2000 | Suzuki |
| 6,069,647 A | 5/2000 | Sullivan et al. |
| 6,072,873 A | 6/2000 | Bewick |
| 6,072,982 A | 6/2000 | Haddad |
| 6,075,330 A | 6/2000 | Terk |
| 6,091,883 A | 7/2000 | Artigalas et al. |
| 6,097,441 A | 8/2000 | Allport |
| 6,105,134 A | 8/2000 | Pinder et al. |
| 6,144,400 A | 11/2000 | Ebisawa |
| 6,148,081 A | 11/2000 | Szymanski et al. |
| 6,148,400 A | 11/2000 | Arnold |
| 6,154,206 A | 11/2000 | Ludtke |
| 6,157,719 A * | 12/2000 | Wasilewski et al. ......... 380/210 |
| 6,157,949 A | 12/2000 | Cheng et al. |
| 6,160,988 A | 12/2000 | Shroyer et al. |
| 6,169,879 B1 | 1/2001 | Perlman |
| 6,198,875 B1 | 3/2001 | Edenson et al. |
| 6,202,211 B1 | 3/2001 | Williams, Jr. |
| 6,229,895 B1 | 5/2001 | Son et al. |
| 6,240,401 B1 | 5/2001 | Oren et al. |
| 6,263,504 B1 | 7/2001 | Ebisawa |
| 6,266,481 B1 | 7/2001 | Lee et al. |
| 6,275,991 B1 | 8/2001 | Erlin |
| 6,286,142 B1 | 9/2001 | Ehreth |
| 6,288,716 B1 | 9/2001 | Humpleman et al. |
| 6,289,455 B1 | 9/2001 | Kocher et al. |
| 6,292,568 B1 | 9/2001 | Akins, III et al. |
| 6,317,883 B2 | 11/2001 | Marics |
| 6,317,884 B1 | 11/2001 | Eames et al. |
| 6,370,688 B1 | 4/2002 | Hejna, Jr. |
| 6,398,245 B1 | 6/2002 | Gruse et al. |
| 6,415,031 B1 | 7/2002 | Colligan et al. |
| 6,437,836 B1 | 8/2002 | Huang et al. |
| 6,456,985 B1 | 9/2002 | Ohtsuka |
| 6,466,671 B1 | 10/2002 | Maillard et al. |
| 6,466,921 B1 | 10/2002 | Cordery et al. |
| 6,473,858 B1 | 10/2002 | Shimomura et al. |
| 6,480,667 B1 | 11/2002 | O'Connor |
| 6,487,663 B1 | 11/2002 | Jaisimha et al. |
| 6,487,722 B1 | 11/2002 | Okura et al. |
| 6,496,980 B1 | 12/2002 | Tillman et al. |
| 6,502,139 B1 | 12/2002 | Birk et al. |
| 6,516,465 B1 | 2/2003 | Paskins |
| 6,519,772 B1 | 2/2003 | Bopardikar |
| 6,530,085 B1 | 3/2003 | Perlman |
| 6,542,870 B1 | 4/2003 | Matsumoto |
| 6,550,011 B1 | 4/2003 | Simms, III |
| 6,560,340 B1 | 5/2003 | Akins et al. |
| 6,574,609 B1 | 6/2003 | Downs et al. |
| 6,611,812 B2 | 8/2003 | Hurtado et al. |
| 6,654,547 B1 | 11/2003 | Maeda et al. |
| 6,655,580 B1 | 12/2003 | Ergo et al. |
| 6,671,881 B1 | 12/2003 | Tamer et al. |
| 6,772,434 B1 | 8/2004 | Godwin et al. |
| 6,810,387 B1 | 10/2004 | Yim |
| 6,853,728 B1 | 2/2005 | Kahn et al. |
| 6,889,208 B1 | 5/2005 | Okabe et al. |
| 2001/0001876 A1 | 5/2001 | Morgan et al. |
| 2001/0046299 A1 | 11/2001 | Wasilewski et al. |
| 2002/0001386 A1 | 1/2002 | Akiyama |
| 2002/0010920 A1 | 1/2002 | Bertram |
| 2002/0023219 A1 | 2/2002 | Treffers et al. |
| 2002/0048367 A1 | 4/2002 | Maillard |
| 2002/0056112 A1 | 5/2002 | Dureau et al. |
| 2002/0112243 A1 | 8/2002 | Hunter et al. |
| 2002/0170054 A1 | 11/2002 | Kudelski et al. |
| 2002/0196939 A1 | 12/2002 | Unger et al. |
| 2003/0002679 A1 | 1/2003 | Akiyama et al. |
| 2003/0002680 A1 | 1/2003 | Akiyama et al. |
| 2003/0005285 A1 | 1/2003 | Graunke |
| 2003/0040962 A1 | 2/2003 | Lewis |
| 2003/0105718 A1 | 6/2003 | Hurtado et al. |
| 2003/0110132 A1 | 6/2003 | Sako |
| 2003/0131349 A1 | 7/2003 | Kuczynski-Brown |

| | | | |
|---|---|---|---|
| 2003/0145183 A1 | 7/2003 | Muehrina | |
| 2003/0174844 A1 | 9/2003 | Candelore | |
| 2003/0188164 A1 | 10/2003 | Okimoto | |
| 2003/0228911 A1 | 12/2003 | Dernis et al. | |
| 2004/0003079 A1 | 1/2004 | Aiu et al. | |
| 2004/0032950 A1 | 2/2004 | Graunke | |
| 2004/0052377 A1* | 3/2004 | Mattox et al. | 380/277 |
| 2004/0073954 A1 | 4/2004 | Bjordammen et al. | |
| 2004/0101138 A1* | 5/2004 | Revital et al. | 380/210 |
| 2004/0102154 A1 | 5/2004 | Klauss et al. | |
| 2004/0148634 A1 | 7/2004 | Arsenault et al. | |
| 2004/0190721 A1 | 9/2004 | Barrett et al. | |
| 2004/0205812 A1 | 10/2004 | Candelore | |
| 2005/0039025 A1 | 2/2005 | Main et al. | |
| 2005/0071280 A1 | 3/2005 | Irwin et al. | |
| 2005/0091681 A1 | 4/2005 | Borden et al. | |
| 2005/0108519 A1 | 5/2005 | Barton et al. | |
| 2005/0144468 A1 | 6/2005 | Northcutt et al. | |
| 2005/0169468 A1 | 8/2005 | Fahrny et al. | |
| 2005/0182931 A1 | 8/2005 | Robert et al. | |
| 2005/0183112 A1 | 8/2005 | Duval | |
| 2006/0107285 A1* | 5/2006 | Medvinsky | 725/25 |

FOREIGN PATENT DOCUMENTS

| | | |
|---|---|---|
| EP | 1353511 | 10/2003 |
| EP | 1369152 | 12/2003 |
| EP | 1418701 | 5/2004 |
| EP | 0002703 | 8/2005 |
| JP | 4-175025 | 6/1992 |
| JP | 5-284499 | 10/1993 |
| JP | 06351023 | 12/1994 |
| JP | 8-125651 | 5/1996 |
| JP | 10-013784 | 1/1998 |
| JP | 11136708 | 5/1999 |
| JP | 2000-122539 | 4/2000 |
| WO | WO 92/11713 | 7/1992 |
| WO | WO 00/13412 | 3/2000 |
| WO | WO 00/14967 | 3/2000 |
| WO | WO 00/19294 | 4/2000 |
| WO | WO 01/37546 | 5/2001 |
| WO | WO 02/15184 | 2/2002 |
| WO | WO 02/065750 | 8/2002 |
| WO | WO 2004/017637 | 2/2004 |
| WO | WO 2004/057871 | 7/2004 |
| WO | WO 2004/082286 | 9/2004 |

OTHER PUBLICATIONS

P. Venkat Rangan et al., "Designing an On-Demand Multimedia Service", IEEE Communications Magazine, Jul. 1992, vol. 30, No. 7, title page and pp. 56-64.

Wanjiun Liao et al., "The Split and Merge Protocol for Interactive Video-On-Demand", IEEE Multimedia, Oct.-Dec. 1997, vol. 4, No. 4, index and pp. 51-62.

Robert Johnson et al., "A Digital Television Sequence Store", IEEE Transactions on Communications, May 1978, vol. COM-26, No. 5, index and pp. 594-600.

"Proposed SMPTE Standard for Television-Splice Points for MPEG-2 Transport Streams", SMPTE Journal, Oct. 1998, SMPTE 312M, pp. 916-925.

Michael Robin et al., "Digital Television Fundamentals-Design and Installation of Video and Audio Systems", McGraw-Hill, Chapter 8, title page(s) and pp. 345-425.

Yongchen Li et al., "Security Enhanced MPEG Player", IEEE, 1996, pp. 169-175.

Fink, Ready to take the dive? It's fast-forward as new DVD and divx formats hit market (includes graphic: home video: the next generation plus: Some selections that show off the system), . . .

Sin-Joo Lee et al., A Survey of Watermarking Techniques Applied to Multimedia, IEEE, 2001, pp. 272-277.

"PocketTV Brings Video to Palm-size PC", Mar. 9, 2000, 2 pages.

1st Report of EBU/SMPTE Task Force for Harmonized Standards for the Exchange of Television Program Material as Bit Streams, May 6, 1997, Version 1.30, pp. 1-73.

B. Schneier, "Applied Cryptography-Protocols, Algorithms, and Source Code in C", 2nd Edition, pp. 216-222, 357-362.

HP Jornada 430/430SE Palm-size PC: User's Guide, Hewlett Packard, 1999, pp. 7-9.

PocketTV-MPEG movie player for Pocket PCT and WinCE, May 17, 2000, MPEG TV, LLC, retrieved from URL: http://web.archive.org/web/2000006210123803/www.mpegtv.com/wince/pockettv/index.html.

Download PockeTV (beta) for WinCE, Nov. 3, 1999, MPEG TV, LLC, retrieved from HRL: http://web.archive.org/web/19991127093158/www.mpegtv.com/wince/pockettv/index.html.

* cited by examiner

DIGITAL MEDIA CONDITIONAL ACCESS SYSTEM FOR HANDLING DIGITAL MEDIA CONTENT

CROSS-REFERENCE TO RELATED APPLICATIONS

This application claims the benefit under 35 U.S.C. Section 119(e) of the following co-pending and commonly-assigned U.S. provisional patent application, which is incorporated by reference herein:

Provisional Application Ser. No. 60/567,910, filed May 4, 2004, by Raynold M. Kahn, David D. Ha, Thomas H. James, and Peter M. Klauss, entitled "DIGITAL MEDIA CONDITIONAL ACCESS SYSTEM FOR HANDLING DIGITAL MEDIA CONTENT."

BACKGROUND OF THE INVENTION

1. Field of the Invention

The present invention relates to systems and methods for providing new digital media services via an enhanced encryption/decryption system to a set-top box.

2. Description of the Related Art

In recent years, there has been an increase in the interest in and use of cable and satellite television services. Set-top boxes (STB) utilized to receive such services may also be used to offer additional advanced services that may require a monthly subscription. For example, personal video recording and video games may be offered though the STB by a broadcast provider. However, prior art/legacy systems have many disadvantages. For example, previous legacy STBs without media data storage capability require manipulation of data in real-time. Further, current STBs designed to support video/audio do not efficiently allow authorizing of non-video services. Additionally, there is no secure means for processing and authorizing/deauthorizing various different types of digital media content. These problems may be better understood by describing prior art service activation techniques and services.

In the prior art broadcast services are generally encrypted at the broadcast headend, and the conditional access controls (e.g., service activation and entitlement checking) are based on the delivery of the correct decryption key (or control word [CW]). Conditional access for digital direct broadcast satellite (DBS) systems usually use a conditional access module (CAM) such as a smart card, for broadcast service activation. Authorizations for services provided by the CAM are received by the CAM in over-the-air conditional access packets (CAPs). Broadcast services and programs are accompanied by program associated data (PAD) that specifies the services required for reception of that program, as well as possible limitations (e.g., regional blackout, parental rating controls). The PAD and CW for current programs are delivered via control word packets (CWP) to the CAM. The future PAD is delivered to the CAM via purchase information packets (PIP) to allow pre-purchase of impulse pay-per-view (IPPV) programs or checking authorizations before the broadcast (e.g., for guide "coloring"). Thus, based on the PADs, CWs, and CAPs; services provided by the STB and reception of broadcast services/programs may be activated.

While these legacy systems are able to control access to streaming broadcast services, such as a television program, or streaming data, the legacy conditional access (CA) and set-top box systems cannot safely and securely deliver and store data objects for digital media services. Additionally, current personal video recorder (PVR) STBs do not have a secure means to process and authorize/deauthorize digital media contents. In this regard, there is no secure means to store, retrieve, authorize, or record digital media contents.

SUMMARY OF THE INVENTION

Digital media services (e.g., gaming, data manipulation, etc.) are enabled and protected via an enhanced encryption/decryption system without losing access to services provided through a legacy conditional access system. The conditional access system of the invention provides an authorization key message (AKM), entitlement management messages (EMM), and entitlement control messages (ECM) that operate in conjunction with legacy systems. The AKM, EMM, and ECM systems are generated and delivered in the headend network and processed inside a set-top box with a hard disk drive.

The broadcast headend network provides a key distribution method for transporting various types of key certificates (AKM, EMM, and ECM) as encrypted software data objects without changing a legacy conditional access system in the headend. The key distribution allows new types of digital media data services to operate, other than real-time video service. These digital media services (e.g., streaming video, games, music, software, etc.) can be transported to legacy PVR set-top boxes and interactive access and purchase of these data services can be supported.

Within the set-top box, a key management system provides the ability to process the AKM, EMM, and ECM to generate authorized data object keys to process the digital media objects. The key management leverages on existing set-top box technology including the hard disk, smart card, and an embedded security chip. In addition to generating and delivering CW for decryption of received broadcast services, the smart card and security chip may generate and deliver data object keys to the set-top box for decryption only when the headend key objects are decrypted successfully. The modular digital media object keys are managed separately and independently from the legacy video/audio conditional access system without causing interference.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description reference is made to the accompanying drawings which form a part hereof and which show, by way of illustration, several embodiments of the present invention. It is understood that other embodiments may be utilized and structural changes may be made without departing from the scope of the present invention.

Video Distribution System

Figure 1:
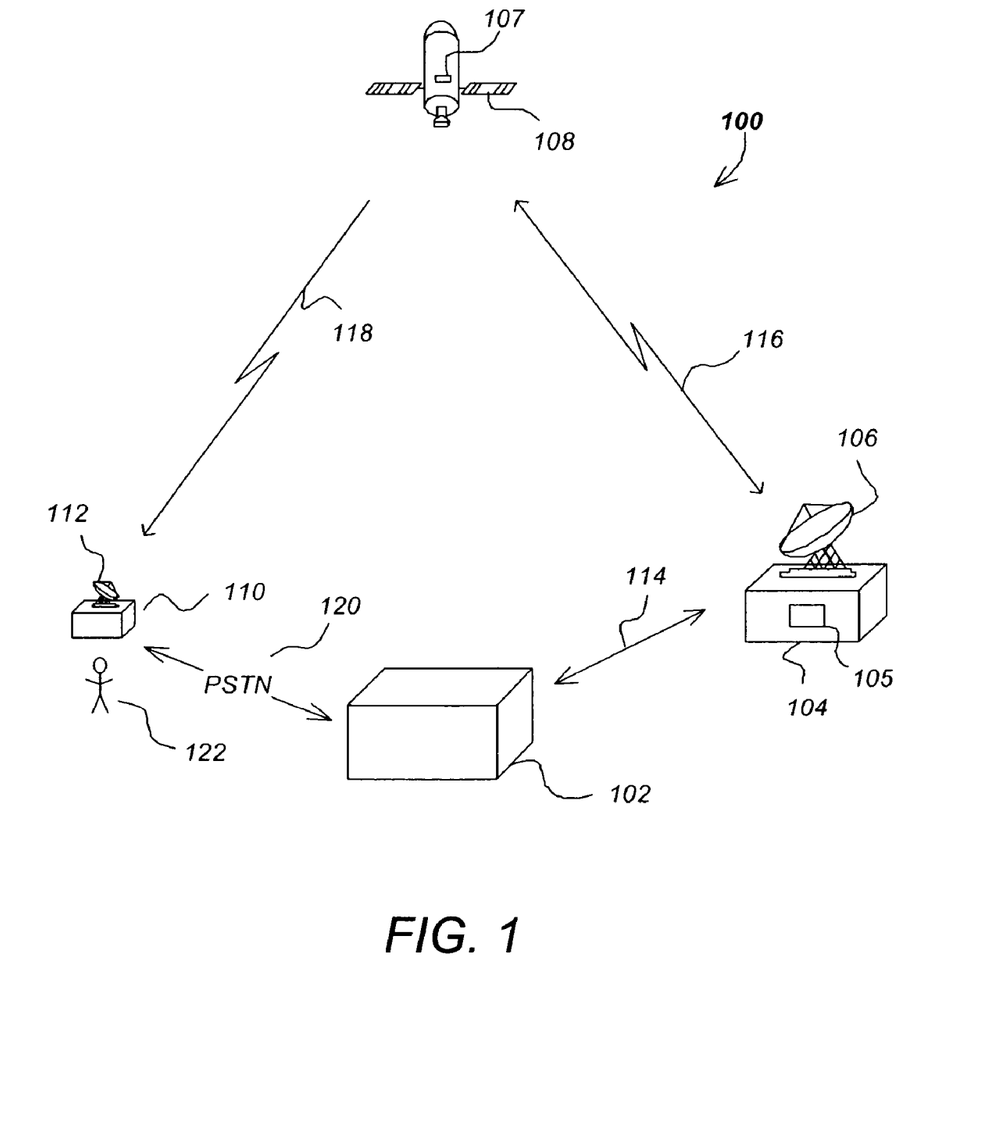
FIG. 1 is a diagram illustrating an overview of a single satellite video distribution system in accordance with one or more embodiments of the invention.

FIG. 1 is a diagram illustrating an overview of a single satellite distribution system 100. The distribution system 100 comprises a control center 102 in communication with an uplink center 104 via a ground or other link 114 and with a subscriber receiver station 10 via a public switched telephone network (PSTN) or other link 120. The control center 102 provides media content (e.g. video programs, audio programs, data, games, etc.) to the uplink center 104 and coordinates with the subscriber receiver stations 110 to offer, for example, pay-per-view (PPV) program services, a music jukebox, video on-demand programs, gaming services, etc. including billing and associated decryption of video programs. The combination of the control center 102 and the uplink center 104 are often referred to as the headend/headend network.

The uplink center 104 receives media content and content control information from the control center 102, and using a transmitter 105 and an uplink antenna 106, transmits the media content and content control information to the satellite 108 via uplink 116. The satellite receives and processes this information, and transmits the media content and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques, two satellites 108 working together can receive and broadcast over 150 conventional (non-HDTV) audio and video channels via 32 transponders.

While the invention disclosed herein will be described with reference to a satellite-based distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

As described above, media content delivered to the subscriber 122 may comprise unlimited types of data. Such types of data may include video (and audio) program material (e.g., a movie), purely audio information, commercial contents, games/gaming services, and other data as well.

Uplink Configuration

Figure 2:
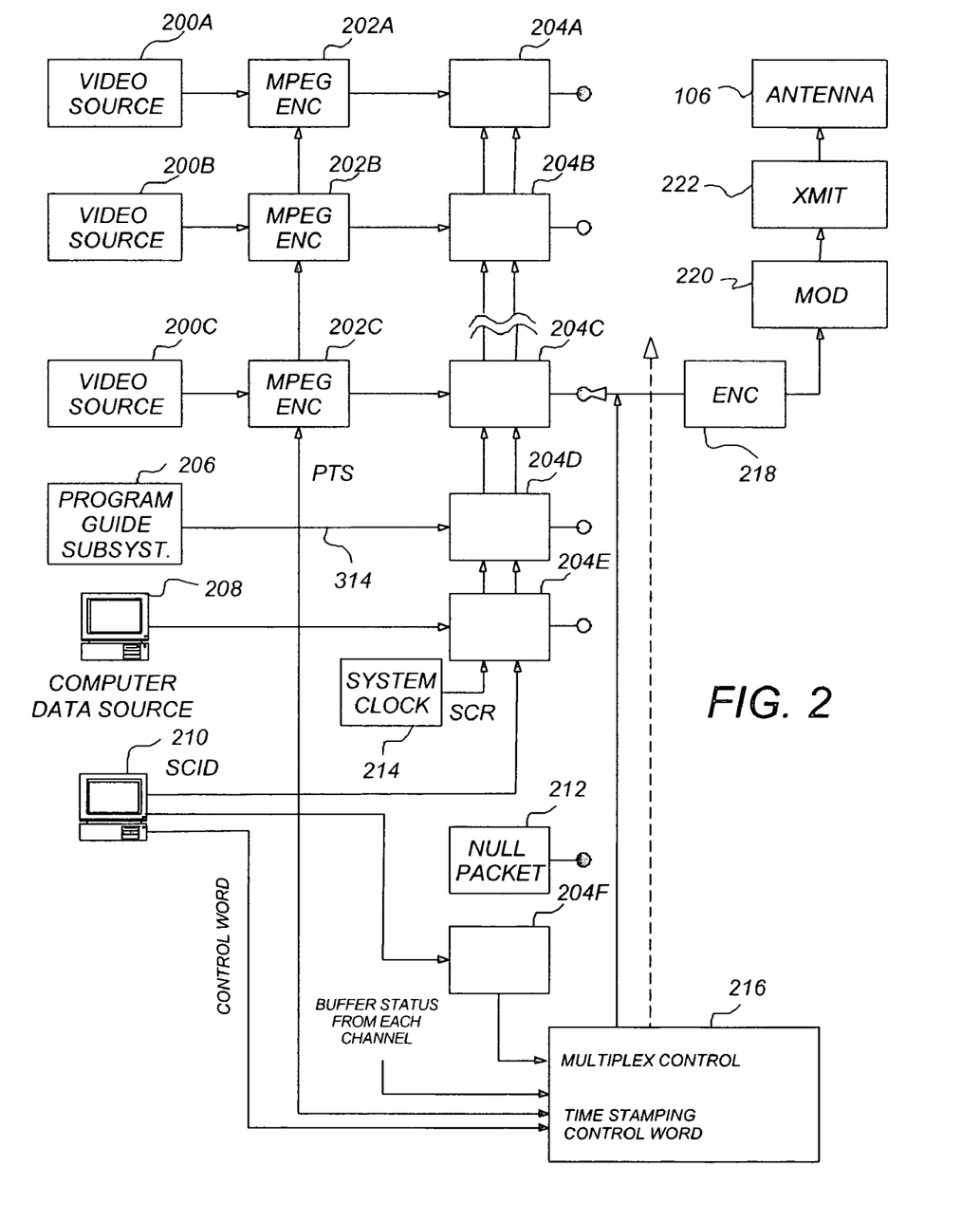
FIG. 2 is a block diagram showing a typical uplink configuration for a single satellite transponder in accordance with one or more embodiments of the invention.

FIG. 2 is a block diagram showing a typical uplink configuration for a single satellite 108 transponder, showing how media content (e.g., video program material) is uplinked to the satellite 108 by the control center 102 and the uplink center 104. FIG. 2 shows three video channels (which could be augmented respectively with one or more audio channels for high fidelity music/MP3 music or non-MPEG formats, soundtrack information, a secondary audio program for transmitting foreign languages, one or more gaming channels for gaming services, etc.), a data channel from a program guide subsystem 206 and computer data information from a computer data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding.

In one embodiment of the present invention, each encoder 202 is a second generation Motion Picture Experts Group (MPEG-2) encoder, but other decoders implementing other coding techniques can be used as well (e.g., an MP3 encoder or other type of coder depending on the content being encoded). The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204C (which together with packetizers 204D-204F are collectively referred to hereinafter as packetizer(s) 204) associated with each source 200.

In one or more embodiments, (and in support of a legacy system), the data packets are assembled using a reference from the system clock 214 (SCR), a control word (CW) generated by the conditional access manager 210 and a system channel identifier (SCID) that associates each of the data packets that are broadcast to the subscriber with a program channel. This information is transmitted to the packetizers 204 for use in generating the data packets. These data packets are then multiplexed into serial data, encoded, modulated, and transmitted.

Conditional Access System

Within the control center 102 (also referred to as a legacy conditional access system 102) a special packet known as a control word packet (CWP), which comprises program associated data (PAD) used in support of providing conditional access to the program material and data from which the control word (CW) can be obtained, is transmitted as described above (e.g., via uplink center 104).

Conditional access information (CAI) is sent in a special packet known as a conditional access packet (CAP) to the subscriber's receivers (i.e., the STB) to authorize presentation of the media programs. CAI may also be used to cancel service, renew service, and to transmit other information to the STB. The STB routes the packets to a conditional access module (CAM) (see detailed description below). Using the CAI, the CAM allows the encrypted media programs to be decrypted, thus activating/deactivating service. Generally, CAPs are transmitted to all subscribers on all channels, with addressing information in the CAP for a specific subscriber or group of subscribers.

In addition to such a legacy system, the present invention provides new services, beyond legacy STB's current capability for digital media, gaming, and data manipulation. Such services are all protected via an enhanced encryption/decryption system without losing access to the services provided through the legacy conditional access system.

The digital media contents are protected through the design and use of authorization key message (AKM), entitlement management message (EMM), and entitlement control message (ECM) systems. Each of these systems operate in conjunction with the legacy conditional access system of the video/audio broadcast network. Further, the AKM, EMM, and ECM messages are generated and delivered by the headend network and processed inside the STB. Details of these systems are described below.

Data Stream

Figure 3A:
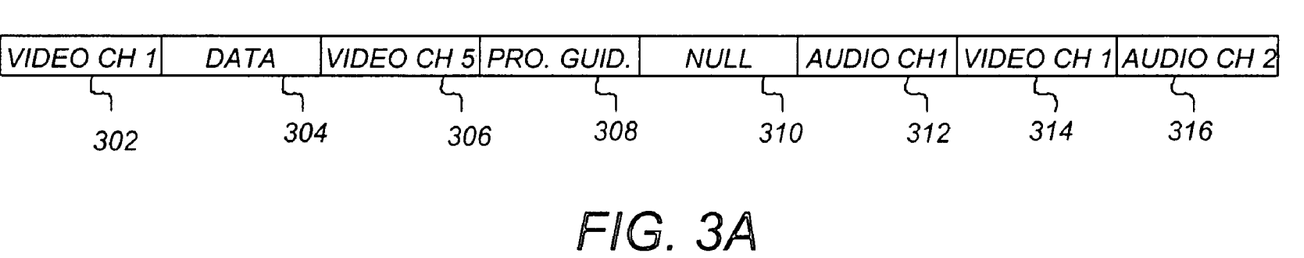
FIG. 3A is a diagram of a representative data stream in accordance with one or more embodiments of the invention.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 212 may be inserted into the data stream as desired. The following packet segments 312-316 comprise, respectively, audio information from channel 1, video information from channel 1 and audio information from channel 2.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscriber receiving stations 110 receive media content via a subscriber receiver (also referred to as an integrated receiver-decoder [IRD] or set-top box [STB]). By collecting all packets labeled with SCIDs corresponding to a given channel, the IRD reassembles the packets to regenerate the program material for each of the channels.

Figure 3B:
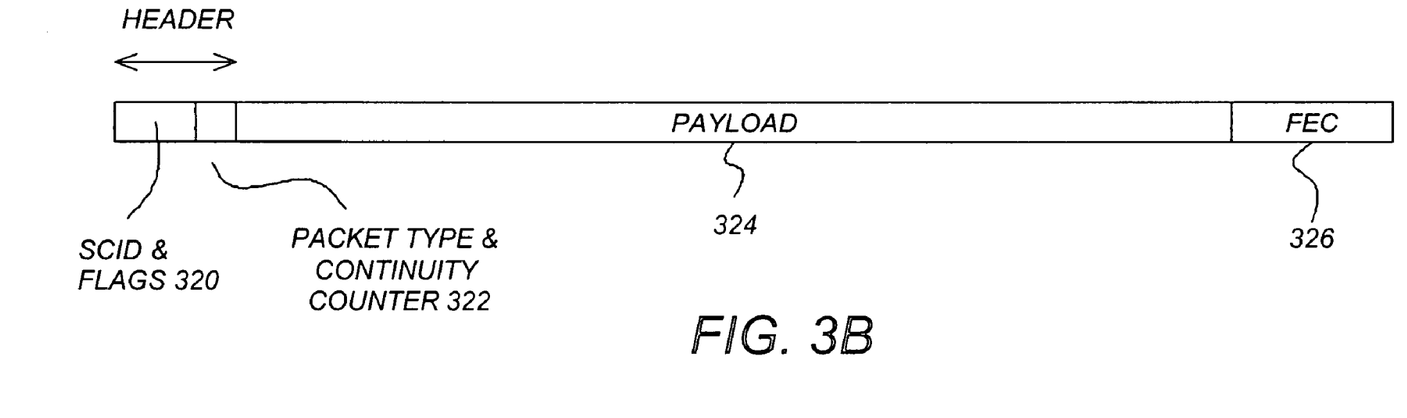
FIG. 3B is a diagram of a data packet in accordance with one or more embodiments of the invention.

FIG. 3B is a diagram of a representative data packet. Each data packet (e.g. 302-316) is 147 bytes long, and comprises a number of packet segments.

The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet.

The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID.

The next packet segment 324 comprises 127 bytes of payload data, an example of which is a portion of the video program provided by the video program source 200. The final packet segment 326 is data required to perform forward error correction.

Media Content Distribution System

Figure 4:
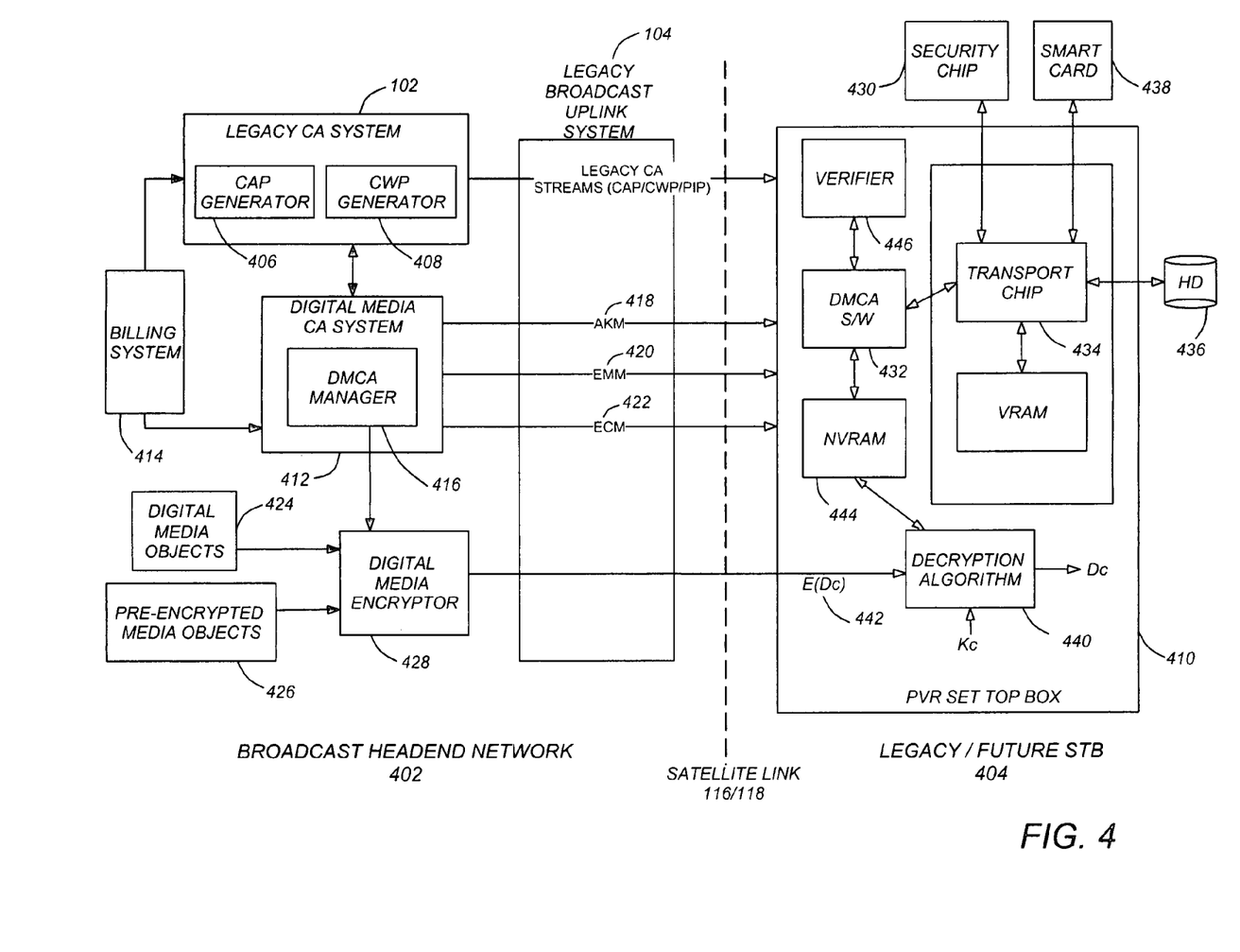
FIG. 4 is a block diagram of an enhanced encryption/decryption system in accordance with one or more embodiments of the invention.

As described above, the invention provides new services, beyond legacy STB's current capabilities for digital media, gaming, and data manipulation, all protected via an enhanced encryption/decryption system. Such types of digital media content may include stored commercial contents, stored and delayed purchasable pay-per-view contents, a music jukebox, music songs in MP3 (motion pictures experts group audio layer 3) or other MPEG (motion pictures experts group) or non-MPEG formats, video on-demand programs, audio clips, video clips, gaming services, games, pre-cache video, and/or professional or commercial training video programs. FIG. 4 is a block diagram of such an enhanced encryption/decryption system in accordance with one or more embodiments of the invention. As illustrated, the components of the broadcast headend network 402 communicate with a legacy or future STB 404 across satellite link 116/118. In this regard, both legacy systems (e.g., legacy conditional access system 102) and enhanced systems are supported by the architecture of the invention.

The broadcast headend network 402 supports the legacy conditional access system 102 (e.g., containing a CAP generator 406 and/or CWP generator 408) without modification to the legacy CA system 102 and uplink center 104. In this regard, the legacy CA system 102 may broadcast legacy conditional access streams (e.g., containing a CAP/CWP/PIP) using the legacy uplink center/system 104 to the PVR STB 410. The billing system 414 interacts with the legacy CA system 102 to account for and authorize broadcast services.

In addition to the legacy system, the broadcast headend network 402 also supports new media content through a digital media conditional access (DMCA) system 412. The billing system 414 interacts with both legacy CA system 102 and digital media CA system 412 to account for, authorize, and provide appropriate digital media content to PVR STB 410.

The broadcast headend network 402 (e.g., through the DMCA manager 416) provides a key distribution method of transporting various types of secret key values and certificates (AKM 418, EMM 420, and ECM 422) as encrypted software data objects without changing legacy conditional access systems 102 in the broadcast headend network 402. The key distribution allows new types of digital media data services to operate, other than real-time video service. These digital media services (e.g., streaming video, games, music, software) can be transported to the legacy PVR video STB 410 which can allow interactive access and purchase of these data services. Further, the digital media contents are processed in the broadcast headend network 402 as modular media objects (either non-encrypted media objects 424 or pre-encrypted media objects 426) with unique AKM 418, EMM 420, and ECM 422 objects. The media objects 424-426 are processed along with the AKM 418, EMM 420, and ECM 422 (e.g., through digital media encryptor 428) to provide appropriate STB authorization, content entitlement, and records of the content usage and authorizations.

Key Management Processes

Authorization Key Message (AKM)

The authorization key message (AKM) is used by the DMCA headend 412 to authorize the STB 410 by establishing a first secret key Ka for secure message exchange.

In the absence of pre-existing secret information shared between DMCA headend 412 and STB 410, public key techniques (e.g., Diffie-Hellman, RSA, etc.) may be used to establish the first secret key Ka. These techniques have security limitations because of the absence of pre-existing secret keys or authentication certificates in the manufactured STB 410 hardware.

In one or more embodiments the STB 410 may be pre-loaded with a second secret key, known only to the headend 402. This second secret key may be programmed in internal EEPROM (electrically erasable programmable read only memory) at manufacture. Alternatively, the second secret key is pre-loaded in a security chip 430 and referred to as a Secret Chip Key [SCK]. In one embodiment, the first secret key Ka is set equal to the embedded second secret key SCK. However, one or more preferred embodiments of the invention may have different SCK and Ka keys in order to (1) avoid directly exposing the hardware secret key SCK to the DMCA software 432 within the STB 410, and (2) maintain the ability to change the first secret key Ka from time to time, as a security countermeasure and for revocation.

The SCK may be used as a secret encryption and authentication key, to securely deliver the first secret key Ka as well as AKM related metadata Ma to the DMCA IRD software 432 in the STB 410. The metadata Ma defines Ka usage rules, including the time period for which the Ka applies. The DMCA headend 412 delivers an AKM message 418 to the STB 410 over the air (e.g., via satellite link 116/118) or via a two-way backlink (e.g., through PSTN 120). In this regard, the AKM message 418 may be delivered at the time of service activation and/or from time to time based on security considerations.

As described herein, the AKM message 418 consists of an encrypted secret key Ka and related metadata Ma, using SCK as the secret encryption key, i.e., AKM=E(Ka, Ma|SCK). Since the Ka and Ma is encrypted based on an SCK that is different for each STB 410, the AKM process may be performed separately for each STB 410. Accordingly, the encryption algorithm (e.g., DES, AES, etc.) may be different for different STB platforms 410 operating in the same system depending on the hardware/software algorithms supported by each platform.

As described above, the SCK may be embedded in a security chip 430 in an advanced digital receiver (ADR). The security chip 430 may implement specific decryption functions (e.g., using an advanced encryption standard [AES] algorithm). Further, the security chip 430 may interface directly with the transport integrated circuit 434 or the security chip functionality may be included as a module inside the transport integrated circuit 434. Further, the security chip 430 may interface with the DMCA software 432 inside the STB 410. A further detailed description below describes key management for the ADR and the use of security chip 430 functionality for the AKM process.

Entitlement Management Messages (EMM)

Entitlement management messages (EMM) 420 are used to deliver entitlement keys Ke as well as associated metadata Me, that defines the usage rules of the delivered entitlement keys.

Entitlement keys may be changed on a regular basis (e.g., monthly). Various types of entitlement keys may exist depending on the type of entitlement/authorization. For example, the types of entitlement keys may include:

Broadcast Keys (Kb) for content that is broadcast to all users;
Service Keys (Ks) for the services subscribed to by the customer;
Unique Keys (Ku) for delivery of content specifically to that customer;
Transaction Keys (Kt) for transaction authentication; and
Reportback Keys (Kr) for encryption and authentication of reportback data.

The DMCA headend 412 may deliver the EMM messages 420 to the STB 410 in a variety of manners (e.g., over the air via broadcast, via two-way backlink, etc.). Further, such EMM 420 deliveries may be on a regular (e.g., monthly) or irregular basis, on demand (e.g., when a service is subscribed, or a media object 424-426 is ordered), and/or on the occurrence of an event (e.g., a system upgrade). However, such delivery is not limited to such specific timing and may occur based on any other type of timing/event determination.

The EMM 420 consists of an encrypted Ke and Me, using the secret key Ka as the encryption key, i.e., EMM=E(Ke, Me|Ka). As described above, EMMs 420 are delivered to and used to authorize and manage content for individual STBs 410. Since the EMM 420 is delivered to each STB 410, the encryption algorithm may be different depending on the STB 410. In this regard, in one or more embodiments, the DMCA 410 may implement a standardized EMM 420 message encryption. In alternative embodiments, a hardware-based EMM 420 may be used in appropriately equipped systems. Further, in an ADR, key management may use the security chip 430 functionality for the EMM 420 process.

As described above, an example of an entitlement key Ke may be a transaction key (Kt) for transaction authentication. Once transactions are performed in the STB 410 by the DMCA 432 (e.g., purchases, usage records, etc.) in accordance with the Kt, the transactions are collected in a transaction record (also referred to as a transaction log) on the HDD 436 for later reportback, or to keep track of the state of entitlement usage (such as when a limited number of uses are authorized/allowed).

In order to authenticate the transaction log, a running authentication may be performed. In the running authentication, each new transaction $T_i$ is dynamically and incrementally authenticated (e.g., $H_i$=Hash $(T_i, H_{i-1})$ where $T_i$ is the $i^{th}$ transaction, including the action, time, and index in the log, and $H_i$ is the $i^{th}$ running hash value. The one-way hash function may be a standard hash algorithm (e.g., secure hash algorithm 1 [SHA-1]) or a one-way hash based on a block encryption algorithm (e.g., $H_i=T_i+E(T_i|K=H_{i-1})$) or a key-dependent one-way hash function (e.g., $H_i=E(T_i+H_{i-1}|Kt)$). To ensure that the transaction log on the HDD 436 is protected against tampering, the current $H_i$ may also be maintained in non-volatile memory in the ADR separate from the HDD 436.

Another example of an entitlement key is a reportback key (Kr) for encryption and authentication of reportback data. In this regard, reportback data may be encrypted and authenticated using the reportback key Kr.

Entitlement Control Messages (ECM)

Entitlement control messages (ECM) 422 are used to deliver the specific media content encryption keys Kc, as well as the associated media content metadata Mc, that specifies the usage rules of the media content. The media content encryption keys Kc may be randomly generated by the DMCA headend 412, or may be third party keys, supplied to the DMCA headend 412 for delivery to the STB 410 for decryption of the third-party content (e.g., using DMCA standard algorithms or third-party proprietary decryption algorithms 440 implemented in the STB 410).

The ECM 422 consists of an encrypted Kc and Mc, using the appropriate Ke as the encryption key i.e., ECM=E(Kc, Mc|Ke). Since the ECM 422 for broadcast content (Ke=Kb) and for subscription content (Ke=Ks) is generally addressed to a large group of subscribers, a standardized encryption algorithm may be generally used. Since the entitlement keys Ke or algorithms may be changed periodically, while certain encrypted content may reside long term in broadcast or storage 436, it may be necessary/useful to re-send content keys Kc and metadata Mc, encrypted under the new Ke each period. A platform specific encryption algorithm (e.g., DES, AES) may be used when the content key Kc is delivered uniquely and differently (Ke=Ku) or in the case of the transaction authentication (Ke=Kt) performed internal to the STB 410, or reportback encryption and authentication (Ke=Kr) where the connection is point-to-point with the DMCA headend 412.

Broadcast Media Encryption

As described above, various keys are encrypted and delivered (via AKM 418, EMM 420, and ECM 422) to the STB 410. The keys allow the STB 410 to appropriately decrypt the keys and the encrypted media content.

Broadcast media encryption is the encryption of the broadcast media content Dc, using the specific media content encryption keys Kc, i.e., E(Dc)=E(Dc|Kc). As described above, the media content Dc may be provided in modular digital media objects 424 or pre-encrypted media objects 426. The digital media encryptor 428 receives these media objects 424-426 along with the encryption key Kc from the digital media encryptor 428 where the content Dc is encrypted. The encrypted content E(Dc) 442 is then delivered to the STB 410 (e.g., via satellite link 116/118.)

Digital Media CA in the Advanced Digital Receiver

The encrypted media content Dc 442 is received by the STB 410. The STB 410 then processes the Dc 442 for the use and display by a user. To enable the ability to provide and process digital media content beyond that of legacy systems, the STB 410 (legacy or future) may utilize various functionality. In an advanced digital receiver (ADR) the smart card 438 and security chip 430 generate and deliver the appropriate authorized object keys to the STB 410 where each of the headend key objects (i.e., AKM 418, EMM 420, and ECM 422) are processed and decrypted successfully. Once the authorized object keys are received from the security chip 430 and smart card 438, the content itself may be processed.

Legacy System

However, to support legacy systems, various functionality may be provided as follows. In the case of a legacy CA system 102, the AKM 418 and EMM 420 may be similar to CAPs. In such a legacy system 102, ECMs 422 may be similar to CWPs and the metadata may be similar to PADs. In such a legacy system, the media encryption may be similar to the DES algorithm, in ECB (electronic code book) mode, and the Kc may be similar to the CW, which is then used to decrypt the media content Dc. In such a legacy system, the CW or encrypted CW (ECW) may be delivered from the smart card 438 to the security chip 430 for loading into the transport integrated circuit 434 wherein the media data content may be received and decrypted. In such a legacy system, the media data content is decrypted as a received data stream (similar to video and audio) and not as individual digital media objects.

The CW may not be paired from the CAM/smart card 438. In this regard, the smart card 438 may obtain the CW from the CWP and deliver the CW to an advanced digital receiver (ADR). Alternatively, the STB 410 may implement strong pairing of the CW from the CAM. In such an embodiment, the smart card 438 obtains the CW from the CWP and encrypts the CW to form an encrypted control word ECW (e.g., using AES and an appropriate key received from the headend). The smart card 438 may then deliver the ECW to the ADR, together with an encrypted form of the key. In addition to the above, to support PVR functionality, media content may be encrypted for storage on the HDD 436.

As described herein, the DMCA system 412 may also be supported by legacy systems in the STB 410. For example, a legacy platform may not have the security chip 430. In this regard, RSA or Diffie-Hellman key exchange with the appropriate certificates may be used to provide the first secret key Ka. Further security may be enhanced using any available hardware security elements in the platform (e.g., security chips, write protected memory, keys buried in the operating system, etc.).

AKM Processing in an ADR

An STB 410 may also utilize a security chip 430 in accordance with embodiments of the invention. In such an embodiment, the secret authorization key Ka and (authorization metadata Ma) is used for DMCA operations within the headend 412. A secret key SCK is embedded in the security chip 430 and may be used in the encryption of Ka and Ma, at the headend 412. The AKM message containing the encrypted Ka is delivered to the STB 410 by a transmission via satellite link 116/118 or point-to-point. At the STB 410, the encrypted key Ka may be stored in non-volatile memory 444 or the HDD 436 for future power-loss recovery. The key Ka may then be decrypted (e.g., using DMCA software 432 and decryption algorithm 440 or in a security chip 430) for use in decrypting encrypted media content Dc.

EMM Processing in an ADR

Once the Ka has been delivered to the STB 410, the STB 410 has the capability to decrypt any EMMs 420 that are received. In this regard, entitlement keys Ke (and entitlement metadata Me) may be delivered to the DMCA 432 and decrypted using a software or hardware decryption algorithm 440 and the secret key Ka. Additional processing may also be performed in verifier 446 to ensure and verify the message is from the appropriate DMCA headend 412.

ECM Processing in an ADR

Once the entitlement keys Ke have been received in the STB 410, the STB 410 is capable of decrypting content keys Kc (and content metadata Mc) received via ECMs 422. As described above, the media content key Kc may be randomly generated by the DMCA headend 412, may be a third-party key delivered via the standard DMCA key management algorithms described herein, or may be a third-party key delivered via the third-party proprietary algorithms that are implemented in the DMCA headend 412 and/or STB 410. Accordingly, the media content key Kc is received in the STB 410 (along with the proper entitlement keys Ke) and decrypted using the DMCA software 432 and decryption algorithm 440.

Thus, the various capabilities in the STB 410 support and provide the capability to utilize new digital media services. However, each of the keys (within the AKM, EMM, and ECM messages) must be successfully decrypted before the new services are available. In this regard and as described above, each key is encrypted with a previous key. Accordingly, the sequence of decryption for each of the keys must be completed in order to complete the decryption of the digital media content. Further, the keys provide the various types of authentication/entitlement needed to utilize the digital services. Without such keys (and information provided with the keys), the use of the digital media content may be prohibited by the system.

Logical Flow

As described above, the invention provides various systems (i.e., AKM 418, EMM 420, and ECM 422) to deliver and encrypt keys and media content for use on a PVR 410. In addition to supporting legacy conditional access systems 102 where video/audio data is encrypted and processed on the STB 410, the system of the invention provides the capability to support new digital media content.

Figure 5:
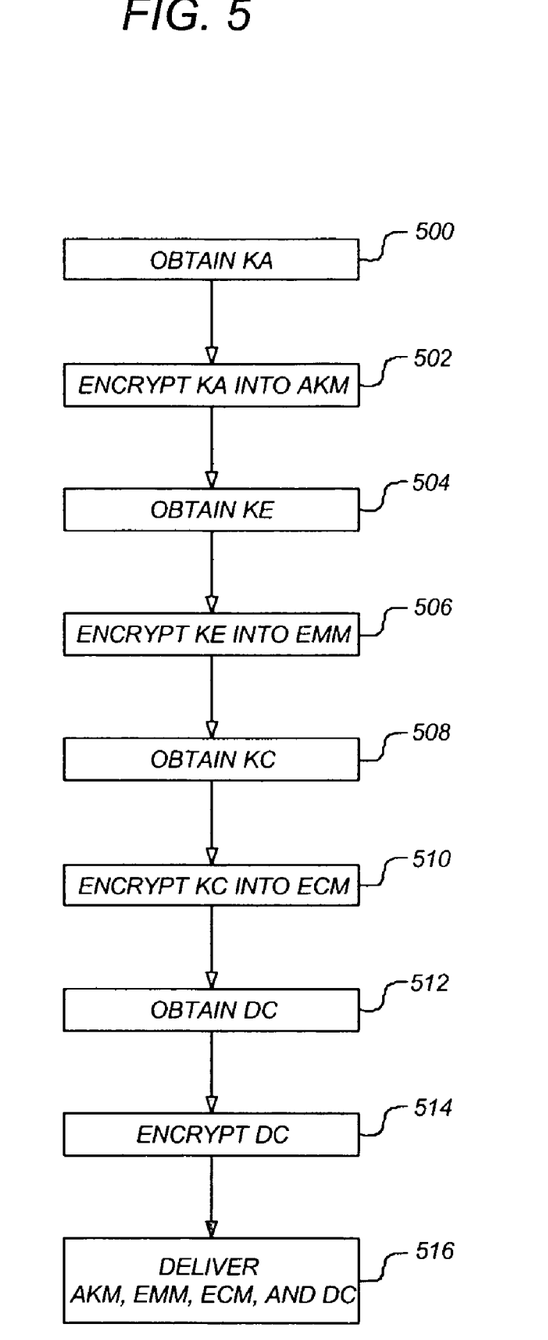
FIG. 5 is a flowchart illustrating the logical flow for providing such capability in accordance with one or more embodiments of the invention.

FIG. 5 is a flowchart illustrating the logical flow for providing such capability in accordance with one or more embodiments of the invention. At step 500, a secret key Ka is obtained. In this regard, the secret key (Ka) may be obtained using public key techniques. The secret key Ka may also be obtained using a secret chip key (SCK). For example, the secret key Ka may be set equal to the SCK and programmed into a security chip 430 of a STB 410. Alternatively, the SCK may be used to encrypt the secret key Ka. In addition, the secret key Ka may be periodically modified.

At step 502, the secret key Ka is encrypted into an authorization key message (AKM) message. The AKM message may also contain authorization related metadata Ma. Such metadata may contain a time period for which the secret key Ka applies.

At step 504, one or more entitlement keys Ke are obtained. Entitlement keys provide for entitlement/authorization for particular types of media content. At step 506, the one or more entitlement keys Ke are encrypted into an entitlement management message EMM. Such encryption uses the secret key Ka as an encryption key. The EMM may also contain encrypted entitlement related metadata Me that defines one or more usage rules of the one or more entitlement keys. The entitlement keys may be changed on a regular basis. In addition, the entitlement keys vary depending on the type of authorization or entitlement. For example, as described above, the entitlement message may be a broadcast key, a service key, a unique key, a transaction key, and/or a report-back key.

At step 508, one or more media content encryption keys Kc are obtained. At step 510, the media content encryption keys Kc are encrypted using the one or more entitlement keys Ke as encryption keys. The encrypted keys Kc are then placed into an entitlement control message ECM. The ECM may also contain associated encrypted media content metadata Mc that defines usage rules for the media content.

At step 512, digital media content Dc is obtained. As described above, such digital media content may be a music jukebox, a delayed purchasable pay-per-view (that is stored in the STB), a video on-demand program, a gaming service, etc. At step 514, the digital media content Dc is encrypted using the one or more media content encryption keys Kc.

At step 516, the AKM message, EMM, ECM, and encrypted digital media data content Dc is delivered to a set-top box that is configured to provide digital media services using the digital media content. Once received by the set-top box 410, the STB processes the content in accordance with the received information. As used herein, the set-top box 410 may be a personal video recorder (PVR) so that the digital media content may be stored and used to provide services beyond traditional services.

In this regard, the security chip 430, smart card 438 and decryption algorithm 440 is used to provide the decrypted content to a user. The various keys are received and processed in the STB 410 to generate authorized object keys to process digital media objects. As illustrated in FIG. 4, the encrypted digital media content 442 is received by the decryption algorithm 440. In addition, the media content encryption key Kc is received and utilized to decrypt the encrypted content E(Dc) 442 to provide the decrypted content Dc.

Smart Card DMCA Functions

In a legacy system, the smart card 438 may be used to provide certain limited digital media conditional access, where the AKM 418 and EMM 420 may be similar to CAPs, and ECMs 422 may be similar to CWPs. In such a legacy system, the content key Kc may be similar to the CW, which is used in the legacy STB to decrypt the digital media as a received data stream. Alternatively, in an ADR, enhanced security may be provided using the smart card 438 for certain content only available on appropriately configured hardware platforms. A key management method inside the STB 410 may also process the AKM 418, EMM 420, and ECM 422 to generate authorized object keys to process digital media objects 424. The key management leverages on the existing STB hard disk 436, smart card 438, and embedded security chip 430. The smart card 438 and security chip 430 may generate and deliver the digital media object keys (e.g. Ka, Ke or Kc) to the STB 410 for decryption only when the headend key objects 418-422 are decrypted successfully. The modular digital media object keys 418-422 are managed separately and independently from the legacy video/audio conditional access system 102 without causing interference.

In such an advanced digital receiver, a specially configured smart card 438 may receive an input DMCA message (such as AKM 418, EMM 420, and ECM 422) from the STB 410, and may perform additional processing, including a decryption algorithm (such as AES) to obtain a secret key (such as Ka, Ke or Kc) to be used in the STB DMCA processing. This secret value may be further encrypted or otherwise processed by the smart card 438 to obtain an output value, which is returned by the smart card 438 to the STB 410. This output from the smart card 438 may then be used by the DMCA software 432 or security chip hardware 430 to obtain the keys (such as Ka, Kc or Kc) for use in authorizing and decrypting digital media data objects.

Alternatively, the legacy smart card may be used in such an advanced digital receiver for delivery and processing of the DMCA messages. In this regard, DMCA messages (such as AKM 418, EMM 420, and ECM 422) may be delivered to the smart card 438 by the STB 410 using CAPs and CWPs. The DMCA manager 416 and legacy CA system 102 in the broadcast headend network 402 will provide the appropriate CAPs and CWPs to the STB 410 for this purpose. Using standard CAP and CWP processing, the legacy smart card 438 may then extract the control word (CW) from the CWP (e.g., in real-time or delayed) and return the CW or further encrypt the CW to return an encrypted control word (ECW) to the STB 410. This output from the smart card 438 may then be used by the DMCA software 432 or security chip 430 to obtain the DMCA keys (such as Ka, Ke or Kc) for use in authorizing and decrypting digital media data objects.

The desired DMCA keys (such as Ka, Ke or Kc) may be delivered for decryption in the ADR, in plaintext, or encrypted for delivery to the DMCA software 432, or encrypted for delivery to security chip hardware 430. By way of example, the Kc may be equal to the value of CW that is returned to the DMCA software 432 in plaintext, or that is encrypted in the smart card to form the ECW, which is returned to the security chip 430 for decryption to obtain Kc. Alternately, the desired DMCA message (such as AKM 418, EMM 420, and ECM 422) may be equal to the value of CW or ECW that is returned from the smart card 438, and which must be further processed by the DMCA software 432 or security chip hardware 430, to obtain the keys (Ka, Ke or Kc) and metadata (Ma, Me or Mc) for use in authorizing and decrypting digital media data objects. By way of example, the ECW from the smart card may be equal to the AKM value that is further decrypted in the security chip 430 using the embedded secret chip key SCK to produce the decrypted authorization key Ka.

Secure Chip DMCA Functions

For enhanced security and processing speed, some or all of the digital media security functions may be performed by the security chip 430 in the STB 410. The security chip 430 may perform a decryption algorithm, such as AES, to decrypt an input value from the DMCA software 432 and then return a decrypted output value to the DMCA software 432. In one such embodiment, the security chip decrypts an input AKM value, using the embedded secret chip key SCK, and returns a decrypted secret key Ka as the output value. In another embodiment, setting the secret key Ka equal to the secret chip key SCK, the security chip decrypts an input EMM value and returns a decrypted entitlement key Ke as the output value.

In a more secure embodiment, the security chip 430 may perform multiple DMCA operations involving successive decryptions, using the same or different decryption algorithms, and internally storing and using the intermediate secret keys for these successive decryptions, while only returning the final result to the STB software. In such an embodiment, an input AKM message may be decrypted using the internal secret chip key SCK to produce an internal secret key Ka, which is in turn used to decrypt an input EMM message, to produce an entitlement key Ke, which is output to the DMCA software 432 for further processing. In another such embodiment, the entitlement key Ke is not output, but is stored and used internally by the security chip 430 to decrypt an input ECM message to produce a media content key Kc which is output to the DMCA software 432 for further processing. In yet another such embodiment, the media content key Kc is not output, but is stored and used internally to decrypt the encrypted media content 442, which is provided as input to the security chip 430, to produce the decrypted media content Dc as output from the security chip 430 to the STB 410.

CONCLUSION

This concludes the description of one or more embodiments of the present invention. The foregoing description of the invention has been presented for the purposes of illustration and description. It is not intended to be exhaustive or to limit the invention to the precise form disclosed. Many modifications and variations are possible in light of the above teaching.

As described herein, the invention provides a method, system, and article of manufacture for processing digital media content and delivering novel services. The invention may not require manipulation of data in real-time. Additionally, a personal video recorder with a smart card and security chip allow greater access to streaming media contents (other than real-time video/audio data). In addition, digital media content may be purchased and recorded securely while using a legacy video/audio conditional access system. In this regard, commercial video content may be stored and manipulated for later use. Also, the key management processes (and digital media content encryption) provide an enhanced and secured method to transport digital media content from a broadcast headend network along with real-time video data. The various processes also provide a safe and secured method to authenticate, store, retrieve, and authorize processing of purchases and records of digital media contents.

To provide such capability, the digital media content are processed in the headend as modular media objects with unique AKM, EMM, and ECM objects. The media objects are then processed along with the AKM, EMM, and ECM to provide necessary authorization and records. The delivery and use of the various keys provide the ability to avoid refreshing digital media content already stored on the set-top box's hard disk. The delivery/distribution of the keys utilizes a software key distribution methodology and leverages on hardware support. Once in the hard disk based set-top box, the various keys and hardware provide for the secure management and authentication of transactions on the set-top box.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing digital media content comprising:
   obtaining, in a broadcast headend, a secret authorization key (Ka);
   obtaining, in the broadcast headend, a secret encryption key (SCK) that is associated with a set-top box;
   encrypting, in the broadcast headend, the authorization key (Ka) using the secret encryption key (SCK) into an authorization key message (AKM) message, wherein the same secret encryption key (SCK) is used to decrypt the encrypted authorization key (Ka) by the set-top box;
   obtaining, in the broadcast headend, one or more entitlement keys (Ke);
   encrypting, in the broadcast headend, the one or more entitlement keys (Ke) using the authorization key (Ka) as an encryption key into an entitlement management message (EMM);
   obtaining, in the broadcast headend, one or more media content encryption keys (Kc);
   encrypting, in the broadcast headend, each of the media content encryption keys (Kc) using one or more of the entitlement keys (Ke) as encryption keys into an entitlement control message (ECM);
   obtaining, in the broadcast headend, digital media data content (Dc);
   encrypting, in the broadcast headend, the digital media data content using the one or more media content encryption keys (Kc);
   delivering, from the broadcast headend, the AKM, EMM, ECM, and encrypted digital media data content to the set-top box configured to provide digital media services with the content.

2. The method of claim 1, wherein the secret encryption key (SCK) comprises a secret chip key (SCK) that is programmed into a secure chip of the set-top box.

3. The method of claim 1, wherein the Ka is periodically modified.

4. The method of claim 1, wherein the AKM message further comprises AKM related metadata (Ma) that comprises a time period for which the authorization key Ka applies.

5. The method of claim 1, wherein the EMM further comprises encrypted entitlement related metadata (Me) that defines one or more usage rules of the one or more entitlement keys.

6. The method of claim 1, further comprising changing the entitlement keys on a regular basis.

7. The method of claim 1, wherein a type of one or more of the entitlement keys is selected from a group consisting of:
   a broadcast key (Kb) for content broadcast to all users;
   a service key (Ks) for services subscribed to by a customer;
   a unique key (Ku) for delivery of content to a specific customer;

a transaction key (Kt) for transaction authentication; and a reportback key (Kr) for encryption and authentication of reportback data.

8. The method of claim 1, wherein the ECM further comprises associated encrypted media content metadata (Mc) that defines one or more usage rules for the media content.

9. The method of claim 1, wherein the set-top box is a personal video recorder (PVR).

10. The method of claim 1, wherein the digital media content comprises a music jukebox.

11. The method of claim 1, wherein the digital media content comprises a delayed purchasable pay-per-view that is stored in the STB.

12. The method of claim 1, wherein the digital media content comprises a video on-demand program.

13. The method of claim 1, wherein the digital media content comprises a gaming service.

14. The method of claim 1, wherein the digital media content comprises one or more modular digital media objects.

15. A system for processing digital media content in a set-top box, comprising:
   (a) a set-top box (STB) configured to receive, from a broadcast headend:
      (i) a secret authorization key (Ka) encrypted, by the broadcast headend, using a secret encryption key (SCK) associated with the STB;
      (ii) an entitlement management message (EMM) comprising one or more entitlement keys (Ke) encrypted using the Ka;
      (iii) an entitlement control message (ECM) comprising one or more media content encryption keys (Kc) encrypted using the one or more Ke;
      (iv) digital media content (Dc) encrypted using the one or more Kc;
   (b) a decryption algorithm on the STB configured to:
      (i) decrypt the Ka using the same SCK;
      (ii) decrypt the Ke using the Ka;
      (iii) decrypt the Kc using the Ke; and
      (iv) decrypt the Dc using the Kc;
   wherein the STB is configured to provide digital media services with the decrypted Dc.

16. The STB of claim 15, wherein the authorization key Ka is periodically modified.

17. The STB of claim 15, further comprising a secure chip communicatively coupled to the STB, wherein:
   the secure encryption key (SCK) comprises a secret chip key that is programmed into the secure chip; and
   the authorization key Ka is decrypted in the secure chip using the SCK.

18. The STB of claim 17, wherein:
   the decrypted authorization key Ka is stored in the secure chip; and
   the entitlement key Ke is decrypted in the secure chip using the authorization key Ka.

19. The STB of claim 18, wherein:
   the decrypted entitlement key Ke is stored in the secure chip; and
   the content key Kc is decrypted in the secure chip using the entitlement key Ke.

20. The STB of claim 19, wherein:
   the decrypted content key Kc is stored in the secure chip; and
   the digital media content is decrypted in the secure chip using the content key Kc.

21. The STB of claim 15, wherein the AKM message further comprises authorization related metadata (Ma) that comprises a time period for which the authorization key Ka applies.

22. The STB of claim 15, wherein the EMM further comprises encrypted entitlement related metadata (Me) that defines one or more usage rules of the one or more entitlement keys.

23. The STB of claim 15, wherein the one or more entitlement keys are changed on a regular basis.

24. The STB of claim 15, wherein a type of one or more of the entitlement keys is selected from a group consisting of:
   a broadcast key (Kb) for content broadcast to all users;
   a service key (Ks) for services subscribed to by a customer;
   a unique key (Ku) for delivery of content to a specific customer;
   a transaction key (Kt) for transaction authentication; and
   a reportback key (Kr) for encryption and authentication of reportback data.

25. The STB of claim 15, wherein the ECM further comprises associated encrypted media content metadata (Mc) that defines one or more usage rules for the media content.

26. The STB of claim 15, further comprising a hard disk communicatively coupled to the STB wherein the hard disk is configured to store the digital media content.

27. The STB of claim 15, wherein the digital media content comprises a music jukebox.

28. The STB of claim 15, wherein the digital media content comprises a delayed purchasable pay-per-view that is stored in the hard disk drive.

29. The STB of claim 15, wherein the digital media content comprises a video on-demand program.

30. The STB of claim 15, wherein the digital media content comprises a gaming service.

31. The STB of claim 15, wherein the digital media content comprises one or more modular digital media objects.

32. The STB of claim 15, further comprising a smart card communicatively coupled to the STB, wherein:
   the smart card receives messages from the STB;
   the smart card further processes these messages;
   the STB receives these further processed messages from the smart card;
   the STB uses these messages from the smart card for processing digital media content.

33. The STB of claim 32, wherein a further processed message from the smart card comprises an encrypted authorization key Ka.

34. The STB of claim 32, wherein a further processed message from the smart card comprises an EMM.

35. The STB of claim 32, wherein a further processed message from the smart card comprises an ECM.

36. The method of claim 1, further comprising:
   obtaining, in the broadcast headend, a second secret encryption key associated with a second set-top box;
   encrypting, in the broadcast headend, the authorization key (Ka) using the second secret encryption key into a second authorization key message (AKM) message;
   delivering, from the broadcast headend, the second AKM, the EMM, ECM, and encrypted digital media data content to the second set-top box configured to provide digital media services with the content.

* * * * *